May 1, 1923.
E. C. LITCHFIELD ET AL
1,454,021
SELF LUBRICATING WHEEL AND PITMAN
Filed July 18, 1921
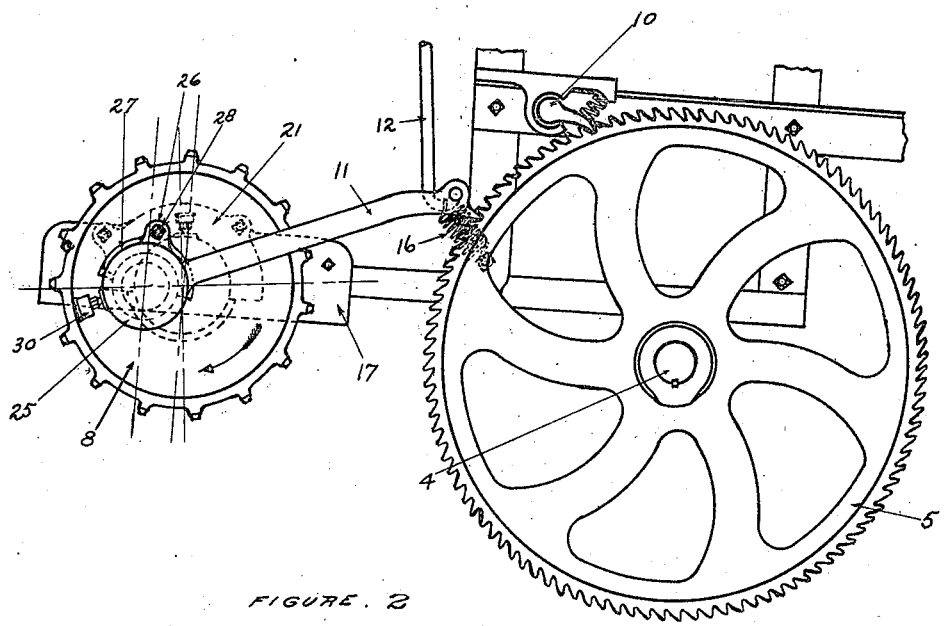
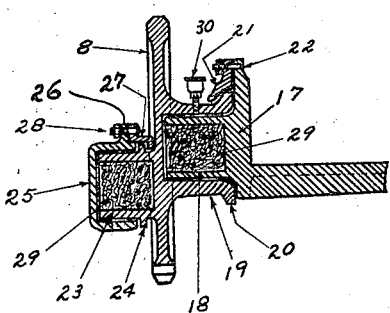
INVENTORS:
E. C. Litchfield,
H. L. Litchfield,
BY Victor Spier.
Chamberlin & Freudenreich
ATTORNEYS.

Patented May 1, 1923.

1,454,021

UNITED STATES PATENT OFFICE.

EDGAR C. LITCHFIELD, HENRY L. LITCHFIELD, AND VICTOR SPEER, OF WATERLOO, IOWA; SAID SPEER ASSIGNOR TO SAID EDGAR C. LITCHFIELD AND SAID HENRY L. LITCHFIELD.

SELF-LUBRICATING WHEEL AND PITMAN.

Application filed July 18, 1921. Serial No. 485,424.

*To all whom it may concern:*

Be it known that we, EDGAR C. LITCHFIELD, HENRY L. LITCHFIELD, and VICTOR SPEER, citizens of the United States, residing at Waterloo, county of Black Hawk, State of Iowa, have invented a certain new and useful Improvement in Self-Lubricating Wheels and Pitmen, and declare the following to be a full, clear, and exact description of the same, such as will enable others skilled in the art to which it pertains to make and use the same, reference being had to the accompanying drawings, which form a part of this specification.

The object of the present invention is to produce a simple and novel means for mounting a rotating or oscillating part so as to hold it revolubly in place and at the same time guard against the entrance of dirt or other foreign matter into the bearing.

A further object of the present invention is to produce a simple and novel journal bearing between two elements one of which rotates or oscillates upon the other, in which effective lubrication may easily be maintained.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Fig. 1 is a side elevation on an enlarged scale showing portions of the feeding mechanism; and Fig. 2 is a section through the driven sprocket wheel on a plane containing the axis of the sprocket wheel and of the crank pin thereon.

Referring to the drawing, 5 represents a ratchet wheel supported on a rotatable shaft 4. A holding pawl 10 permits rotation of the ratchet wheel in one direction and prevents it from moving in the opposite direction. The ratchet wheel is adapted to be driven by a pitman 11 actuated by a suitable driving member, such as a sprocket wheel 8, the free end of the pitman being provided with or given the form of a nose adapted to engage the teeth of the ratchet wheel. The free end of the pitman is normally held against the ratchet wheel by means of a spring 16 and may be lifted out of engagement with the ratchet wheel by means of an actuating rod 12.

The device illustrated is particularly adapted for use as part of the feeding mechanism of fertilizer distributers, so that there is always much dirt and other foreign matter seeking entrance into the bearings of the moving parts. One of the features of the present invention has to do with means for rotatably supporting the driving wheel or member 8 and the journalled end of the pitman in such a way as not only to make the construction simple, but also to reduce to a minimum the possibility of the entrance of dirt and dust into the bearings.

In the arrangement shown the driven sprocket wheel is supported by a casting, 17, bolted to or otherwise secured to the frame of the machine to which the invention is applied. This casting has a projecting journal, 18, which is surrounded by a sleeve or hub, 19, extending laterally from one side of the sprocket wheel. This hub or sleeve has at its free end, that is the end next to the casting, an outwardly-projecting annular flange, 20. Overlying the inner end of the sleeve or hub is a semi-circular plate, 21, shaped so that one portion fits against the casting while another portion extends downwardly past the flange on the hub. The member 21 is fastened to the casting by means of bolts, 22, or otherwise. When the parts are assembled, as shown, the member 21 not only serves to prevent the withdrawal of the hub from the journal but it also forms a protecting shield over the upper half of the inner end of the hub so that any dirt or dust falling downwardly and which would otherwise find its way between the inner end of the hub and the casting, will be deflected and fall harmlessly to the ground.

The same principle as that embodied in the attachment of the sprocket wheel to the casting is also employed in the attachment of the inner end of the connecting rod or pitman to the crank pin, 23. The crank pin has near its inner end an annular flange, 24, spaced apart somewhat from the adjacent face of the sprocket wheel which carries it. The connecting rod or pawl has at the end thereof a cup-shaped portion, 25, fitting over the crank pin and forming a cap therefor. The part, 25, has an upwardly projecting ear, 26, at the top thereof and to this ear is attached a semi-circular shield, 27, Z-shaped in cross section; one flange of the shield lying against and being secured to the ear by means of a bolt, 28, or otherwise, the web of the section extending horizontally across the upper half of the flange, 24, and the other flange of the shield extending downwardly behind the flange 24. This shield prevents the separation of the connecting rod from the crank pin and also serves as a deflector to prevent the entrance of dirt or dust into the bearing.

A further feature of our invention has to do with the lubrication of certain of the bearings which, in mechanisms of this type, it has been difficult to keep effectively lubricated. To this end we make both the journal, 18, and the crank pin, 23, hollow, preferably in the form of mere shells having only sufficient wall thickness to give them the necessary mechanical strength initially and after considerable wear has taken place. The chambers within the journal and crank pin are then packed with oil-soaked waste, as indicated at 29. The oil is replenished from time to time in any suitable way, preferably by providing the hub, 19, and the cap or socket, 25, with compression grease cups as indicated at 30. These grease cups are intended to be filled regularly but, because of the oil reservoirs or chambers within the two bearings, a surplus of oil is maintained so that it will be redistributed over long periods of time. The effective lubrication which is thus obtained, combined with the large bearing surfaces because of the comparatively large diameters of the journal and the crank pin, gives to these bearings much longer life than is obtained in the case of ordinary bearings.

While we have illustrated and described with particularity only a single preferred form of our invention, we do not desire to be limited to the exact structural details thus illustrated and described; but intend to cover all forms and arrangements which come within the terms employed in the definitions of our invention constituting the appended claims.

We claim:

1. A wheel having on opposite sides cup-shaped bearing members whose open ends are directed outwardly, one of said bearings members being at the axis of the wheel and the other being displaced from said axis.

2. A wheel having integral therewith cup-shaped bearing members projecting from opposite sides with their open ends directed outwardly, one of said bearing members being at the axis of the wheel and the other being displaced from said axis.

3. In combination, a support having projecting therefrom a cup-shaped journal open at the outer end, a wheel having a cup-shaped bearing member fitting over said journal and forming with the same a closed chamber for containing oil soaked waste, said bearing member having an annular flange, and a part secured to said support and overhanging said flange to permit the wheel to rotate and hold it against withdrawal from the journal.

4. In combination, a wheel, a cup-shaped crank pin projecting from the same and open at the outer end, a pitman having at one end a cup-shaped bearing member fitting over the same, and forming therewith a closed chamber for receiving oil soaked waste, and means for holding said bearing member against axial displacement while permitting rotation thereof.

5. In combination, a wheel, a cup-shaped crank pin projecting from the same and opened at the outer end, a pitman having at one end a cup-shaped bearing member fitting over the same, and forming therewith a closed chamber for receiving oil soaked waste, said crank pin having a flange extending around the same, and a combined guard and holding device attached to said pitman and engaged over said flange to hold the pitman on the crank pin.

6. In combination, a support having a cup-shaped journal projecting therefrom, a wheel having on one side a cup-shaped bearing member fitting on said journal, means for holding said journal and said bearing member in telescoped relation to each other, a cup-shaped crank pin projecting from the other side of said wheel, a pitman having at one end a cup-shaped bearing member fitting over said crank pin, and means for holding the last-mentioned bearing rotatably on the crank pin.

7. In combination, a support having a cup-shaped journal projecting therefrom, a wheel having integral therewith a cup-shaped bearing projecting from one side thereof and fitting over said journal and a cup-shaped crank pin projecting from the other side, a pitman having a cup-shaped member at one end fitting on said crank pin, means for holding the wheel against axial displacement relatively to said journal, and means for holding the pitman against axial displacement relative to the crank pin.

8. In combination, a support having a cup-shaped journal projecting therefrom and open at the outer end, a wheel having a cup-shaped bearing member fitting over said journal and forming therewith a closed chamber for containing oil soaked waste, said bearing member having an annular flange, and a part secured to said support and overhanging said flange to permit the wheel to rotate and hold it against withdrawal from the journal, said part being long enough to serve as a dust-guard covering the upper half of the free end of said bearing member.

9. In combination, a support having integral therewith a projecting cup-shaped journal open at the outer end, a wheel having integral therewith a cup-shaped bearing fitting over said journal and forming therewith a closed chamber for containing oil soaked waste, said bearing member having integral therewith an annular flange, and a part secured to said support and overhanging said flange to permit the wheel to rotate and hold it against withdrawal from the journal.

10. In combination, a wheel having integral therewith a cup-shaped crank pin open at the outer end, a pitman having integral therewith a cup-shaped bearing member fitting over said crank pin and forming therewith a closed chamber adapted to contain oil soaked waste, and means for holding said bearing member against axial displacement while permitting rotation thereof on the crank pin.

In testimony whereof, we sign this specification.

EDGAR C. LITCHFIELD.
HENRY L. LITCHFIELD.
VICTOR SPEER.